US008595472B2

(12) United States Patent
Dierks, Jr. et al.

(10) Patent No.: US 8,595,472 B2
(45) Date of Patent: Nov. 26, 2013

(54) GANGED HARDWARE COUNTERS FOR COORDINATED ROLLOVER AND RESET OPERATIONS

(75) Inventors: Herman D. Dierks, Jr., Round Rock, TX (US); Andres Herrera, Austin, TX (US); Bernard A. King-Smith, Lake Katrine, NY (US); Kiet H. Lam, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 449 days.

(21) Appl. No.: 12/951,211

(22) Filed: Nov. 22, 2010

(65) Prior Publication Data
US 2012/0131314 A1    May 24, 2012

(51) Int. Cl.
  G06F 7/38    (2006.01)
  G06F 9/00    (2006.01)
  G06F 9/44    (2006.01)
  G06F 15/00   (2006.01)

(52) U.S. Cl.
  USPC .......................................................... 712/227

(58) Field of Classification Search
  None
  See application file for complete search history.

(56) References Cited

U.S. PATENT DOCUMENTS

| 5,835,702 | A | 11/1998 | Levine et al. | |
|---|---|---|---|---|
| 6,480,966 | B1 * | 11/2002 | Rawson, III | 713/400 |
| 7,174,554 | B2 | 2/2007 | Pierce et al. | |
| 7,340,378 | B1 | 3/2008 | Floyd et al. | |
| 7,392,370 | B2 | 6/2008 | DeWitt, Jr. et al. | |
| 7,401,169 | B2 | 7/2008 | Holbrook | |
| 7,461,383 | B2 | 12/2008 | Gara et al. | |
| 7,574,587 | B2 | 8/2009 | DeWitt, Jr. et al. | |
| 2006/0230391 | A1 | 10/2006 | Alexander, III et al. | |
| 2008/0049757 | A1 * | 2/2008 | Bugenhagen | 370/395.1 |
| 2010/0077246 | A1 | 3/2010 | Dittrich et al. | |

FOREIGN PATENT DOCUMENTS

| JP | 4280340 | 10/1992 |
|---|---|---|
| JP | 2004252982 | 9/2004 |
| JP | 2008124966 | 5/2008 |

OTHER PUBLICATIONS

Attig, Michael et al., "Statistic Counter for Networking Hardware Modules", WUCS-2002-20, Jul. 17, 2002, http://www.arl.wustl.edu/arl/projects/fpx, pp. 1-18.

* cited by examiner

Primary Examiner — Corey S Faherty
(74) Attorney, Agent, or Firm — Stephen J. Walder, Jr.; Libby Z. Toub (57) ABSTRACT

Mechanisms for controlling rollover or reset of hardware performance counters in the data processing system. A signal indicating that a rollover or reset of a first hardware performance counter has occurred is received and it is determined if the first hardware performance counter is analytically related to one or more second hardware performance counters based on defined ganged hardware performance counter sets. A signal is sent to each of the one or more second hardware performance counters in response to a determination that the first hardware performance counter is analytically related to the one or more second hardware performance counters. Each of the one or more second hardware performance counters is reset to an initial value in response to the one or more second hardware performance counters receiving the signal from the ganged hardware performance counter rollover/reset logic.

20 Claims, 4 Drawing Sheets

GANGED HARDWARE COUNTERS FOR COORDINATED ROLLOVER AND RESET OPERATIONS

BACKGROUND

The present application relates generally to an improved data processing apparatus and method and more specifically to mechanisms for providing ganged hardware counters for coordinated rollover and reset operations.

Many modern processors and integrated circuit chips implement hardware counters used for collecting counts of the occurrences of events in the hardware. This information may be used for analyzing performance or debugging problems in a computer system. For example, U.S. Pat. Nos. 5,835,702; 7,340,378; 7,392,370; 7,461,383; and 7,574,587 each describe different types of hardware performance counters used in processor or integrated circuit chip devices for counting the occurrence of events for purposes of performance analysis.

With these hardware based counters, it is often the case that a hardware counter will have a relationship to other hardware counters in the processor or integrated circuit chip. As a result, analysis of a processor or integrated circuit chips' performance may require investigation into the counts recorded in several of these hardware counters. For example, the analysis may involve looking at both a first counter that counts a number of bus events and a second counter that counts a number of retries of bus events. If the number of retries exceeds the number of bus events, then a problem may exist in the performance of the hardware. Thus, in order to determine if such a hardware problem exists, the analysis mechanisms must investigate both the values maintained in both hardware counters.

A problem exists, however, when a hardware counter that has an analytical relationship (in terms of performance analysis; not an actual physically or logically specified relationship) with other hardware counters is reset or rolls-over due to counting more events than a counter's maximum value. That is, a reset or roll-over of one hardware counter does not mean that the other related hardware counters will be similarly reset or rolled-over. Thus, these related hardware counters may continue to count events and as a result may have values that do not correlate to the reset or rolled-over hardware counter.

SUMMARY

In one illustrative embodiment, a method, in a data processing system, is provided for controlling rollover or reset of hardware performance counters in the data processing system. The method comprises receiving, in ganged hardware performance counter rollover/reset logic of the data processing system, a signal indicating that a rollover or reset of a first hardware performance counter has occurred. The method further comprises determining, by the ganged hardware performance counter rollover/reset logic, if the first hardware performance counter is analytically related to one or more second hardware performance counters based on defined ganged hardware performance counter sets. Moreover, the method comprises sending, by the ganged hardware performance counter rollover/reset logic, a signal to each of the one or more second hardware performance counters in response to a determination that the first hardware performance counter is analytically related to the one or more second hardware performance counters. In addition, the method comprises resetting each of the one or more second hardware performance counters to an initial value in response to the one or more second hardware performance counters receiving the signal from the ganged hardware performance counter rollover/reset logic.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for providing ganged hardware counters for coordinated rollover and reset operations. As mentioned above, problems arise when hardware counters, that are related to one another with regard to analysis for determining hardware problems, rollover or reset. For example, one hardware counter may rollover or reset while others that are related to that hardware counter are not reset or rolled-over, which may result in a mismatch between the values measured by the hardware counters. There are no mechanisms presently available in known architectures for determining the relationships between hardware counters or for determining the affects of such rests or roll-overs of one hardware counter on related hardware counters, let alone providing mechanisms for controlling the rollover or reset of related hardware counters. The illustrative embodiments provide such mechanisms.

With the mechanisms of the illustrative embodiments, hardware counters that are related to each other through analysis are further related to each other via a correlation mechanism which defines sets of related hardware counters, referred to herein as "ganged" hardware counters. Hardware counter control logic is further provided for performing a lookup in the correlation mechanism when a hardware counter is rolled-over or reset, to identify any related hardware counters, if any. If there are related hardware counters identified in the correlation mechanism, then signals are sent to those related hardware counters to cause them, or force them, to rollover or reset. Moreover, logic may be provided for storing the current values of the related hardware counters at the time of the forced rollover or reset along with an event identification to specify the forced rollover or reset. In this way, information regarding the forced rollover may be stored for later use by analysis mechanisms if necessary. Furthermore, when the analysis mechanisms investigate the values stored in ganged hardware counters, the values within these counters will be correlated such that an incorrect analysis result is made less likely.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
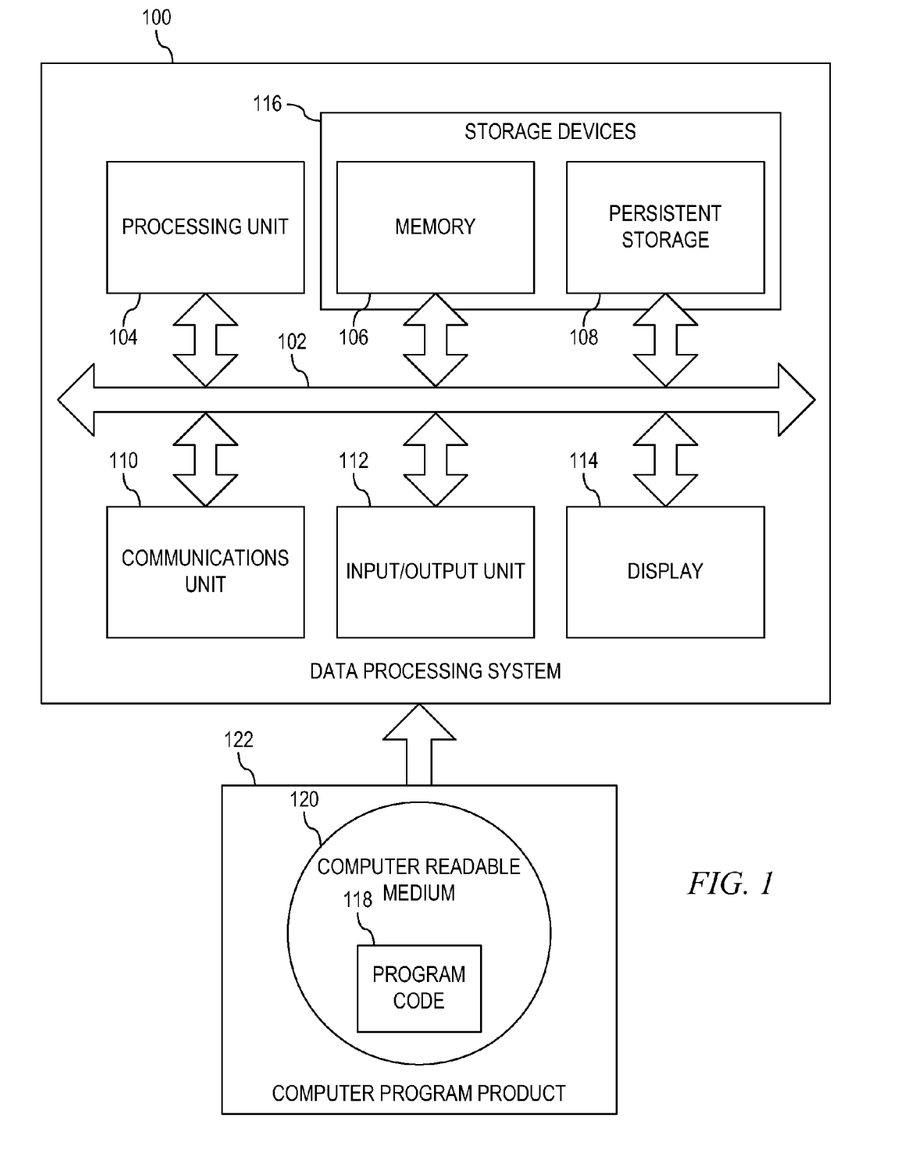
FIG. 1 is an example diagram of a data processing system in which aspects of the illustrative embodiments may be implemented.
Figure 2:
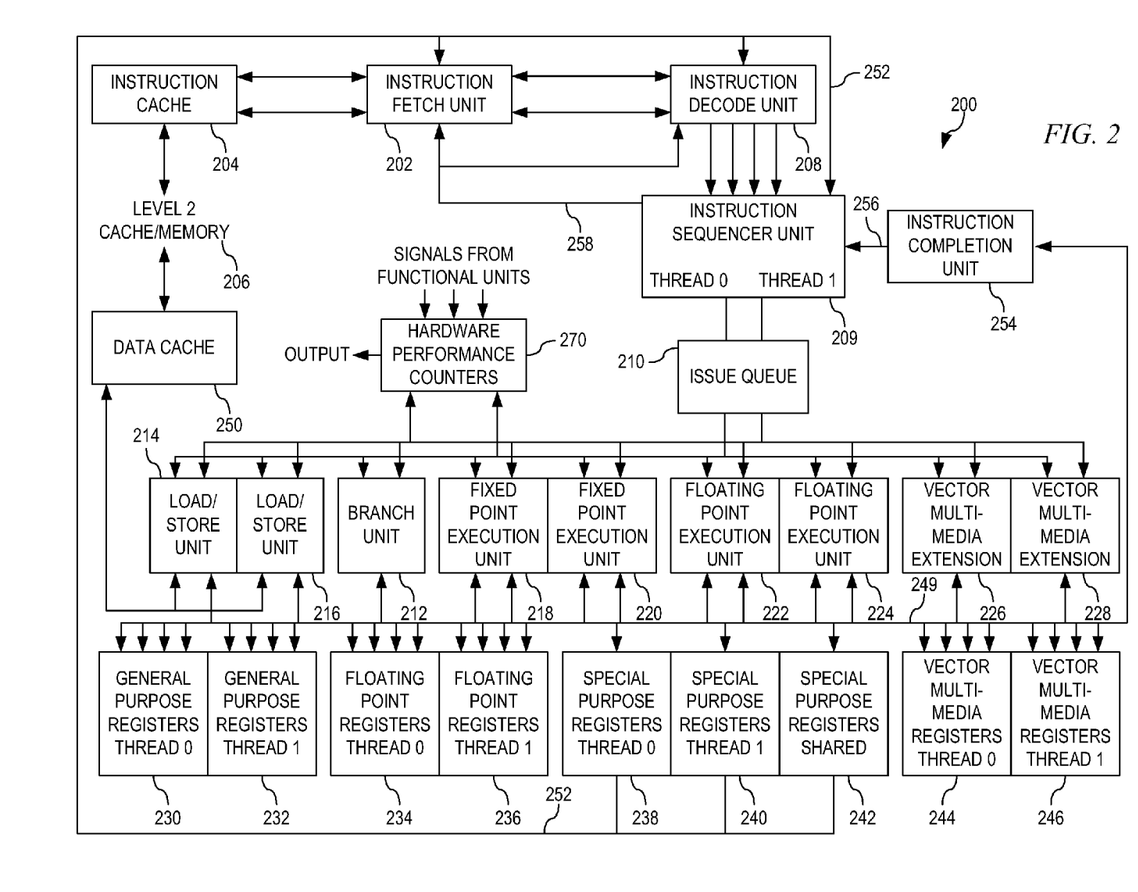
FIG. 2 is an example block diagram of an example processor architecture in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a block diagram of a data processing system in which illustrative embodiments may be implemented. Data processing system 100 is an example of a computer, in which computer usable program code or instructions implementing the processes may be located for the illustrative embodiments. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instruction are in a functional form on persistent storage 108. These instructions may be loaded into memory 106 for execution by processor unit 104. The processes of the different embodiments may be performed by processor unit 104 using computer implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Referring to FIG. 2, an exemplary block diagram of a conventional dual threaded processor design showing functional units and registers is depicted in accordance with an illustrative embodiment. While a dual threaded processor design is shown in FIG. 2 as an example, it should be appreciated that the present invention and the illustrative embodiments set forth herein are not limited to a dual threaded processor design. Moreover, the present invention and illustrative embodiments are not limited to RISC processors, those only incorporating a single instruction fetch unit, instruction decode unit, and instruction cache, or the like. Rather, the present invention and illustrative embodiments may be implemented in many different processor designs and architectures without departing from the spirit and scope of the illustrative embodiments. For example, the present invention and illustrative embodiments may be implemented in processor designs that support more or less than two threads, e.g. a processor design having 1, 3, 4, or more threads. Moreover, the present invention and illustrative embodiments may be implemented in processor designs that fetch instructions from a L3 or higher cache, may have multiple memory units, or the like.

In addition, it should be appreciated that while FIG. 2 illustrates a number of different types of functional units and register types, not all of these functional units and register types are necessary in processor designs in which the illustrative embodiments and the present invention are implemented. Processor designs in which one or more of the functional units and register types shown in FIG. 2 are not present may still be used to implement the mechanisms of the illustrative embodiments and present invention.

As shown in FIG. 2, processor 200 may be implemented as processing unit 104 in FIG. 1, for example. Processor 200 comprises a single integrated circuit superscalar microprocessor with dual-thread simultaneous multi-threading (SMT) that may also be operated in a single threaded mode. Accordingly, as discussed further herein below, processor 200 includes various units, registers, buffers, memories, and other sections, all of which are formed by integrated circuitry. Also, in an illustrative embodiment, processor 200 operates according to reduced instruction set computer (RISC) techniques.

As shown in FIG. 2, instruction fetch unit (IFU) 202 connects to instruction cache 204. Instruction cache 204 holds instructions for multiple programs (threads) to be executed. Instruction cache 204 also has an interface to level 2 (L2) cache/memory 206. IFU 202 requests instructions from instruction cache 204 according to an instruction address, and passes instructions to instruction decode unit 208. In one illustrative embodiment, IFU 202 may request multiple instructions from instruction cache 204 for up to two threads at the same time. In this illustrative embodiment, instruction decode unit 208 decodes multiple instructions for up to two threads at the same time and passes decoded instructions to instruction sequencer unit (ISU) 209.

Processor 200 may also include issue queue 210, which receives decoded instructions from ISU 209. Instructions are stored in the issue queue 210 while awaiting dispatch to the appropriate execution units. For an out-of order processor to operate in an in-order manner, ISU 209 may selectively issue instructions quickly using false dependencies between each instruction. If the instruction does not produce data, such as in a read after write dependency, ISU 209 may add an additional source operand (also referred to as a consumer) per instruction to point to the previous target instruction (also referred to as a producer). Issue queue 210, when issuing the producer, may then wakeup the consumer for issue. By introducing false dependencies, a chain of dependent instructions may then be created, whereas the instructions may then be issued only in-order. ISU 209 uses the added consumer for instruction scheduling purposes and the instructions, when executed, do not actually use the data from the added dependency. Once ISU 209 selectively adds any required false dependencies, then issue queue 210 takes over and issues the instructions in order for each thread, and outputs or issues instructions for each thread to execution units 212, 214, 216, 218, 220, 222, 224, 226, and 228 of the processor. This process will be described in more detail in the following description.

In an illustrative embodiment, the execution units of the processor may include branch unit 212, load/store units (LSUA) 214 and (LSUB) 216, fixed point execution units (FXUA) 218 and (FXUB) 220, floating point execution units (FPUA) 222 and (FPUB) 224, and vector multimedia extension units (VMXA) 226 and (VMXB) 228. Execution units 212, 214, 216, 218, 220, 222, 224, 226, and 228 are fully shared across both threads, meaning that execution units 212, 214, 216, 218, 220, 222, 224, 226, and 228 may receive instructions from either or both threads. The processor includes multiple register sets 230, 232, 234, 236, 238, 240, 242, 244, and 246, which may also be referred to as architected register files (ARFs).

An ARF is a file where completed data is stored once an instruction has completed execution. ARFs 230, 232, 234, 236, 238, 240, 242, 244, and 246 may store data separately for each of the two threads and by the type of instruction, namely general purpose registers (GPRs) 230 and 232, floating point registers (FPRs) 234 and 236, special purpose registers (SPRs) 238 and 240, and vector registers (VRs) 244 and 246. Separately storing completed data by type and by thread assists in reducing processor contention while processing instructions.

The processor additionally includes a set of shared special purpose registers (SPR) 242 for holding program states, such as an instruction pointer, stack pointer, or processor status word, which may be used on instructions from either or both threads. Execution units 212, 214, 216, 218, 220, 222, 224, 226, and 228 are connected to ARFs 230, 232, 234, 236, 238, 240, 242, 244, and 246 through simplified internal bus structure 249.

In order to execute a floating point instruction, FPUA 222 and FPUB 224 retrieves register source operand information, which is input data required to execute an instruction, from FPRs 234 and 236, if the instruction data required to execute the instruction is complete or if the data has passed the point of flushing in the pipeline. Complete data is data that has been generated by an execution unit once an instruction has completed execution and is stored in an ARF, such as ARFs 230, 232, 234, 236, 238, 240, 242, 244, and 246. Incomplete data is data that has been generated during instruction execution where the instruction has not completed execution. FPUA 222 and FPUB 224 input their data according to which thread each executing instruction belongs to. For example, FPUA 222 inputs completed data to FPR 234 and FPUB 224 inputs completed data to FPR 236, because FPUA 222, FPUB 224, and FPRs 234 and 236 are thread specific.

During execution of an instruction, FPUA 222 and FPUB 224 output their destination register operand data, or instruction data generated during execution of the instruction, to FPRs 234 and 236 when the instruction has passed the point of flushing in the pipeline. During execution of an instruction, FXUA 218, FXUB 220, LSUA 214, and LSUB 216 output their destination register operand data, or instruction data generated during execution of the instruction, to GPRs 230 and 232 when the instruction has passed the point of flushing in the pipeline. During execution of a subset of instructions, FXUA 218, FXUB 220, and branch unit 212 output their destination register operand data to SPRs 238, 240, and 242 when the instruction has passed the point of flushing in the pipeline. Program states, such as an instruction pointer, stack pointer, or processor status word, stored in SPRs 238 and 240 indicate thread priority 252 to ISU 209. During execution of an instruction, VMXA 226 and VMXB 228 output their destination register operand data to VRs 244 and 246 when the instruction has passed the point of flushing in the pipeline.

Data cache 250 may also have associated with it a non-cacheable unit (not shown) which accepts data from the processor and writes it directly to level 2 cache/memory 206. In this way, the non-cacheable unit bypasses the coherency protocols required for storage to cache.

In response to the instructions input from instruction cache 204 and decoded by instruction decode unit 208, ISU 209 selectively dispatches the instructions to issue queue 210 and then onto execution units 212, 214, 216, 218, 220, 222, 224, 226, and 228 with regard to instruction type and thread. In turn, execution units 212, 214, 216, 218, 220, 222, 224, 226, and 228 execute one or more instructions of a particular class or type of instructions. For example, FXUA 218 and FXUB 220 execute fixed point mathematical operations on register source operands, such as addition, subtraction, ANDing, ORing and XORing. FPUA 222 and FPUB 224 execute floating point mathematical operations on register source operands, such as floating point multiplication and division. LSUA 214 and LSUB 216 execute load and store instructions, which move operand data between data cache 250 and ARFs 230, 232, 234, and 236. VMXA 226 and VMXB 228 execute single instruction operations that include multiple data. Branch unit 212 executes branch instructions which conditionally alter the flow of execution through a program by modifying the instruction address used by IFU 202 to request instructions from instruction cache 204.

Instruction completion unit 254 monitors internal bus structure 249 to determine when instructions executing in execution units 212, 214, 216, 218, 220, 222, 224, 226, and 228 are finished writing their operand results to ARFs 230, 232, 234, 236, 238, 240, 242, 244, and 246. Instructions executed by branch unit 212, FXUA 218, FXUB 220, LSUA 214, and LSUB 216 require the same number of cycles to execute, while instructions executed by FPUA 222, FPUB 224, VMXA 226, and VMXB 228 require a variable, and a larger number of cycles to execute. Therefore, instructions that are grouped together and start executing at the same time do not necessarily finish executing at the same time. "Completion" of an instruction means that the instruction is finishing executing in one of execution units 212, 214, 216, 218, 220, 222, 224, 226, or 228, has passed the point of flushing, and all older instructions have already been updated in the architected state, since instructions have to be completed in order. Hence, the instruction is now ready to complete and update the architected state, which means updating the final state of the data as the instruction has been completed. The architected state can only be updated in order, that is, instructions have to be completed in order and the completed data has to be updated as each instruction completes.

Instruction completion unit 254 monitors for the completion of instructions, and sends control information 256 to ISU 209 to notify ISU 209 that more groups of instructions can be dispatched to execution units 212, 214, 216, 218, 220, 222, 224, 226, and 228. ISU 209 sends dispatch signal 258, which serves as a throttle to bring more instructions down the pipeline to the dispatch unit, to IFU 202 and instruction decode unit 208 to indicate that it is ready to receive more decoded instructions.

While processor 200 provides one detailed description of a single integrated circuit superscalar microprocessor with dual-thread simultaneous multi-threading (SMT) that may also be operated in a single threaded mode, the illustrative embodiments are not limited to such microprocessors. That is, the illustrative embodiments may be implemented in any type of processor architecture in which hardware performance counters are utilized, as described hereafter.

With particular pertinence to the illustrative embodiments, the processor 200 includes hardware performance counters 270 that count occurrences of various events within the processor 200 or integrated circuit chip upon which the processor 200 is provided. The hardware performance counters 270 may receive signals from various functional units, buses, and other elements of the processor 200 or integrated circuit chip, upon the occurrence of an event. These signals may cause corresponding ones of the hardware performance counters 270 to increment when the signal is received in the hardware performance counter 270. The hardware performance counters 270 store a value indicative of a number of the events counted by the hardware performance counters 270. The values of the hardware performance counters 270 may be periodically (e.g., every sampling period), or upon the occurrence of an event, written to a memory or other storage device, or may be output to a separate device for use in analyzing the operation of the processor 200 or integrated circuit chip. Hardware performance counters, such as those shown in FIG. 2, are generally known in the art and may come in a variety of different types. Examples of such hardware performance counters are provided in U.S. Pat. Nos. 5,835,702; 7,340,378; 7,392,370; 7,461,383; and 7,574,587.

As mentioned above, while hardware performance counters 270 may provide insight to analysis tools with regard to the performance of the processor 200 or the integrated circuit chip, problems occur due to the analytical relationships between hardware performance counters and the occurrence of rollover or reset operations with regard to analytically related hardware performance counters.

For example, assume that there are two hardware performance counters 270, one counter for counting the number of bus events of a system bus, and another counter for counting a number of times a bus event was retried. If there are a greater number of retried bus events than number of bus events, there may be two possible reasons for this situation.

In one scenario, bus events may have been counted by the hardware performance counters and, for most of the sampling period, there may have been more bus events than retried bus events. This is probably not a problem, however if the first counter counting the bus events rolls-over, or just that one counter was reset, then one would see more retried events than bus event attempts. Since there were originally less retry events than bus events, the processor 200 or integrated circuit chip (collectively referred to hereafter as the "device") may not be having a problem. If instead, the device was actually generating more bus retries because the bus events could not get through the system bus to their destination for some reason, there may be a problem. However, from the viewpoint of the analytical tools, the hardware performance counter values that will be seen by the analytical tools will be the same for both possibilities, i.e. no problem with the operation of the device and a possible problem with the operation of the device. As a result, the analytical tools may determine a problem with the operation of the device when there is not one present, or may determine that there is not a problem with the operation of the device when in fact there is one present.

This problem arises from the fact that the rollover or resetting of one hardware performance counter does not necessarily have any effect on the values in other hardware performance counters, i.e. the hardware performance counters generate their count values independently of each other. The illustrative embodiments solve this problem by establishing sets of hardware performance counters, referred to as "ganged" hardware performance counters, based on analytical relationships between the hardware performance counters. That is, a human user, the analytical tools, or the like, may specify which hardware performance counters are analytically related to each other based on the way in which these hardware performance counters are going to be used by the analytical tools. This information may then be stored in logic associated with the hardware performance counters so that these analytical relationships can be used, when a hardware performance counter rolls-over or is reset, to reset the value of analytically related hardware performance counters. As a result, the values stored by the analytically related hardware performance counters are kept consistent with each other and can be correlated accurately by the analytical tools to determine performance of the particular device.

Figure 3:
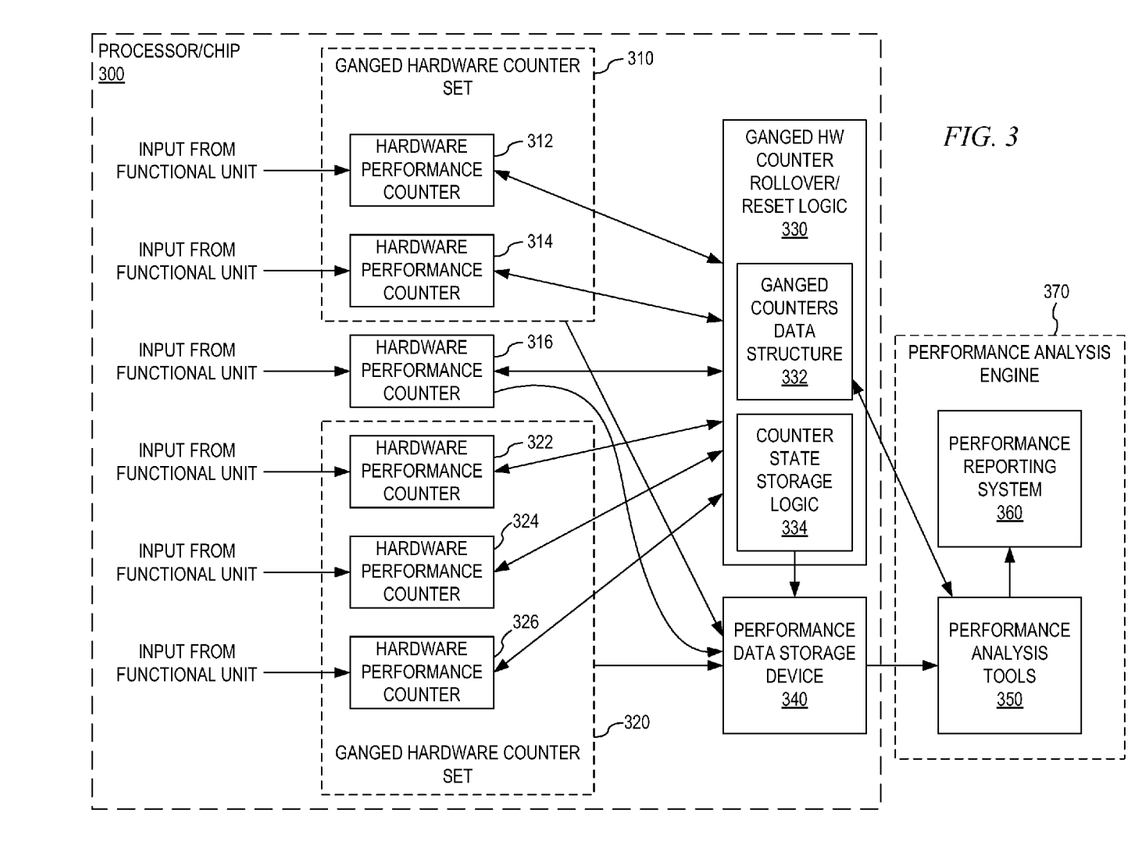
FIG. 3 is an example block diagram of the primary operational elements for providing a set of ganged hardware counters for coordinated rollover and reset operations in accordance with one illustrative embodiment.

FIG. 3 is an example block diagram of the primary operational elements for providing a set of ganged hardware counters for coordinated rollover and reset operations in accordance with one illustrative embodiment. The elements shown in FIG. 3 are implemented in hardware of a processor or integrated circuit chip with the possible exception of the performance analysis engine 370 which may be implemented as hardware, software, or any combination of hardware and software. In one illustrative embodiment, the performance analysis engine 370 may be implemented as software instructions executing on one or more processors of a data processing device. This data processing device may be separate from the processor, integrated circuit chip, or data processing device/system in which the other elements of FIG. 3 are provided. Similarly, the performance data storage device 340 may be provided in the processor or integrated circuit chip, or may be part of a separate device, such as the data processing device implementing the performance analysis engine 370, for example.

As shown in FIG. 3, a plurality of hardware performance counters 312-316 and 322-326 (hereafter referred to simply as "counters") are provided for counting events occurring from various types of functional units. While the example shown in FIG. 3 shows input signals to the counters 312-316 and 322-326 being only from functional units (e.g., the execution units, instruction fetch, decode, sequencer, and completion units, etc.) of the processor, integrated circuit chip, or the like, the illustrative embodiments are not limited to such. As previously mentioned above, the counters 312-316 and 322-326 may count events from any element of the processor/integrated circuit chip 300 or other type of device that uses hardware performance counters. For example counters 312-316 and 322-326 may count bus events for one or more buses of the processor/integrated circuit chip 300, bus retry events for one or more buses, number of cache misses, number of branch mis-predictions, number of instructions executed, or any other performance measurement.

The counters 312-316 and 322-326 may be hardware performance counters 270 in FIG. 2, for example, and may be implemented as hardware elements of a processor/integrated circuit chip 300, or the like. In one illustrative embodiment, the counters 312-316 and 322-326 may be registers with associated logic for incrementing the values in the registers upon the receipt of a corresponding signal from a functional unit, bus, or other element of the processor, integrated circuit chip, or the like (i.e. the device). In one illustrative embodiment, registers corresponding to counters that are analytically related to one another may be contiguous in a bank of registers. Thus, as described hereafter, if any one of the values in one of these registers is set to an initial value, e.g., 0, then all of the other registers in the same contiguous set of registers may be reset to the initial value, e.g., 0. Alternatively, the registers corresponding to the counters may not be in a contiguous set within a bank of registers but may instead be dispersed but may be associated with each other through the mechanisms of the illustrative embodiments such that they are analytically related to one another to ensure resetting of related counters when any one counter in the set of related counters, or "ganged counters," has an initial value, as described hereafter. Such associations can be performed using a data structure, pointers, or the like, that have structures for associating counters with each other.

In addition to the counters 312-316 and 322-326, the processor/integrated circuit chip 300 includes ganged hardware counter rollover/reset logic 330, which may be implemented in hardware and/or firmware of the processor/chip 300. This logic is responsible for determining if a counter 312-316 and 322-326 is analytically related to any other counters 312-316 and 322-326 in response to a signal from the counter 312-316 and 322-326 indicating that the counter 312-316 and 322-326 has rolled over or has been reset. That is, when a counter 312-316 and 322-326 rolls-over or is reset to an initial value, e.g., 0, then the counter 312-316 and 322-326 sends a signal to the ganged hardware counter rollover/reset logic 330 indicating that the counter 312-316 and 322-326 has rolled-over or reset. Based on an identity of the particular counter 312-316, 322-326 that rolled-over or was reset, a lookup operation is performed by the ganged hardware counter rollover/reset logic 330 in a ganged counters data structure 332 to determine if that particular counter 312-316, 322-326 has any analytically related counters 312-316, 322-326. If so, then the ganged hardware counter rollover/reset logic 330 sends a signal to the analytically related counters 312-316, 322-326 to cause them to rollover or reset to their initial values. In addition, prior to rolling over or resetting the values of these related counters 312-316, 322-326, the state of these counters 312-316, 322-326 may be stored in a counter state storage logic 334 for later output to a performance data storage device 340 for possible use by the performance analysis tools 350 in determining the operation of the processor/chip 300.

The ganged counters data structure 332 may store entries for each counter 312-316, 322-326 or for a range of counters, e.g., a range of addresses corresponding to registers used to implement the counters. For example, as shown in FIG. 3, counters 312 and 314 are analytically related to one another and thus, constitute a first ganged hardware counter set 310. This analytical relationship may be specified in entries within the ganged counters data structure 332 such that the identity of counter 312 is correlated with the identity of counter 314, and vice versa. As a result, if either of counters 312 or 314 rollover or is reset, the other counter 312 or 314 will be rolled-over or reset as well by operation of the ganged hardware counter rollover/reset logic 330. That is, a lookup operation performed by the ganged hardware counter rollover/reset logic 330 based on the identity of counter 312, for example, will result in counter 314 being identified and thus, the ganged hardware counter rollover/resent logic 330 will send a signal to counter 314 to cause the value stored in counter 314 to be rolled-over or reset to an initial value for the counter 314. Prior to the rollover or reset of counter 314, however, the state of counter 314 may be stored to the counter state storage logic 334 for later output to the performance data storage device 340 for use by performance analysis tools 350.

The specification of analytically related counters 312-316, 322-326 may take many different forms based on the way in which the counters 312-316, 322-326 are implemented in the processor/chip 300. For example, in one illustrative embodiment, counters 312-316, 322-326 may be implemented as registers whose values are incremented in response to the detection of corresponding events from functional units, buses, etc. In order to associate analytically related counters with one another, the counters 312-316, 322-326 that are analytically related to one another may be provided as contiguous sets of registers within a bank of registers. Thus, for example, registers corresponding to counters 312-314 may be contiguous with one another and registers corresponding to counters 322-326 may be contiguous with one another, but not necessarily contiguous with other counters. As a result, the ganged counters data structure 332 may store address ranges for contiguous registers that represent ganged hardware counter sets 310 and 320, for example.

Alternatively, other mechanisms may be used to specify associations between counters 312-316, 322-326 so as to define ganged hardware counter sets. For example, the counters 312-316, 322-326 may have associated identifiers and these identifiers may be correlated in entries in the ganged counters data structure 332 as described previously. Pointers in data structures associated with the hardware performance counters 312-316, 322-326 may be used to point to the data structures of related counters in a chain like format. Any way of associating the counters with one another may be used to associate related hardware performance counters for purposes of ganged roll-over or resetting may be used without departing from the spirit and scope of the illustrative embodiments.

Any number of counters 312-316, 322-326 may be grouped together in a ganged hardware counter set without departing from the spirit and scope of the illustrative embodiments. For example, as shown in FIG. 3, the ganged hardware counter set 310 comprises two counters 312-314 whereas the ganged hardware counter set 320 comprises three counters 322-326. Counter 316 is not analytically related to any of the other counters 312-314, 322-326 in this example and thus, is not part of a ganged hardware counter set 310. As a result, when the ganged hardware counter rollover/reset logic 330 performs a lookup operation to identify any analytically related counters to counter 316, there will not be any related counters identified and no signals are sent out to reset other counters.

In another example, each of the counters 312-316, 322-326 may be capable of counting various different events and may be configured by other hardware/software, e.g., performance analysis tools 350, to monitor one or more of these various events. In such a case, the counters 312-316, 322-326 need to be able to be ganged or not depending on the events that a counter counted. For example, assume that there are 4 counters, and there are 10 possible events that each counter can count. If one counter is counting an event that is a subject to a ganged-rollover, i.e. is associated with an event another counter is counting, then the corresponding counters need to be ganged or associated with each other using the mechanisms of the illustrative embodiments such that a ganged rollover or resetting of the associated counters can be performed. If a first counter is counting an event, but no one else is counting the events associated with the event being counted by the first counter, then the mechanisms of the illustrative embodiments will not look for a ganged hardware performance counter set associated with the first counter.

The determination as to which counters 312-316, 322-326 are analytically related to one another may be made by a human user, an automated mechanism, or the like, and may be communicated to the ganged hardware counter rollover/reset logic 330 for storage in the ganged counters data structure 332. For example, a user may specify, such as via a user interface to the performance analysis tools 350, which hardware performance counters 312-316, 322-326 are related to one another. Such a determination may be made based on the user's own understanding of the operation of the various counters and the analysis to be performed. The user interface to the performance analysis tools 350 may provide a listing of the various counters 312-316, 322-326 that are available in the processor/chip 300 and provide user interface elements for specifying which ones of these are analytically related to one another, e.g., by way of a field for entry of identifiers of counters, a drop-down menu for selecting a ganged hardware counter set designator and being able to associate multiple counters 312-316, 322-326 to be part of the same ganged hardware counter set having the same designator, a drag-and-drop type mechanism, or any other generally known user interface mechanism for associating information/data. The results of these designations may be communicated by the performance analysis tools 350 to the ganged hardware counter rollover/reset logic 330 on the processor/chip 300 and used to store appropriate entries in the ganged counters data structure 332.

Alternatively, an automated mechanism may be provided that looks at the analysis rules used by the performance analysis tools 350 and determines which counter's values together affect decisions made by the performance analysis tools 350. Based on this analysis of the analysis rules, it can be determined which counter's values should be analytically related to one another and this information may be conveyed to the ganged hardware counter rollover/reset logic 330 for use in generating the entries in the ganged counters data structure 332. For example, an analysis rule may operate on the counter values of a plurality of counters and thus, these counters are related to one another. Based on this relationship, the counters may be associated with each other using the mechanisms of the illustrative embodiments.

The counters 312-316, 322-326 may have their values periodically (e.g., at the end of every sampling period), or in response to particular events, output to a performance data storage device 340, as is generally known in the art. The counter value information may then be provided to the performance analysis tools 350 for analysis and determinations regarding the performance of the processor/chip 300. The results of this analysis may be provided to a performance reporting system 360 which may generate reports for use by a human user. These reports may provide information regarding the performance characteristics of the processor/chip 300 such that problems in performance or operation of the processor/chip 300 may be identified for rectification.

Thus, the illustrative embodiments provide mechanisms for defining ganged hardware counter sets such that rollovers or resets of any counter in the ganged hardware counter sets will cause a rollover or reset of all other counters in the ganged hardware counter set. This keeps analytically related counters consistent with each other with regard to the events being counted so that analytical tools are less likely to identify problems in the performance of a device when none are present, or indicate proper performance when problems are present, based on the relative measures of the analytically related counters.

Figure 4:
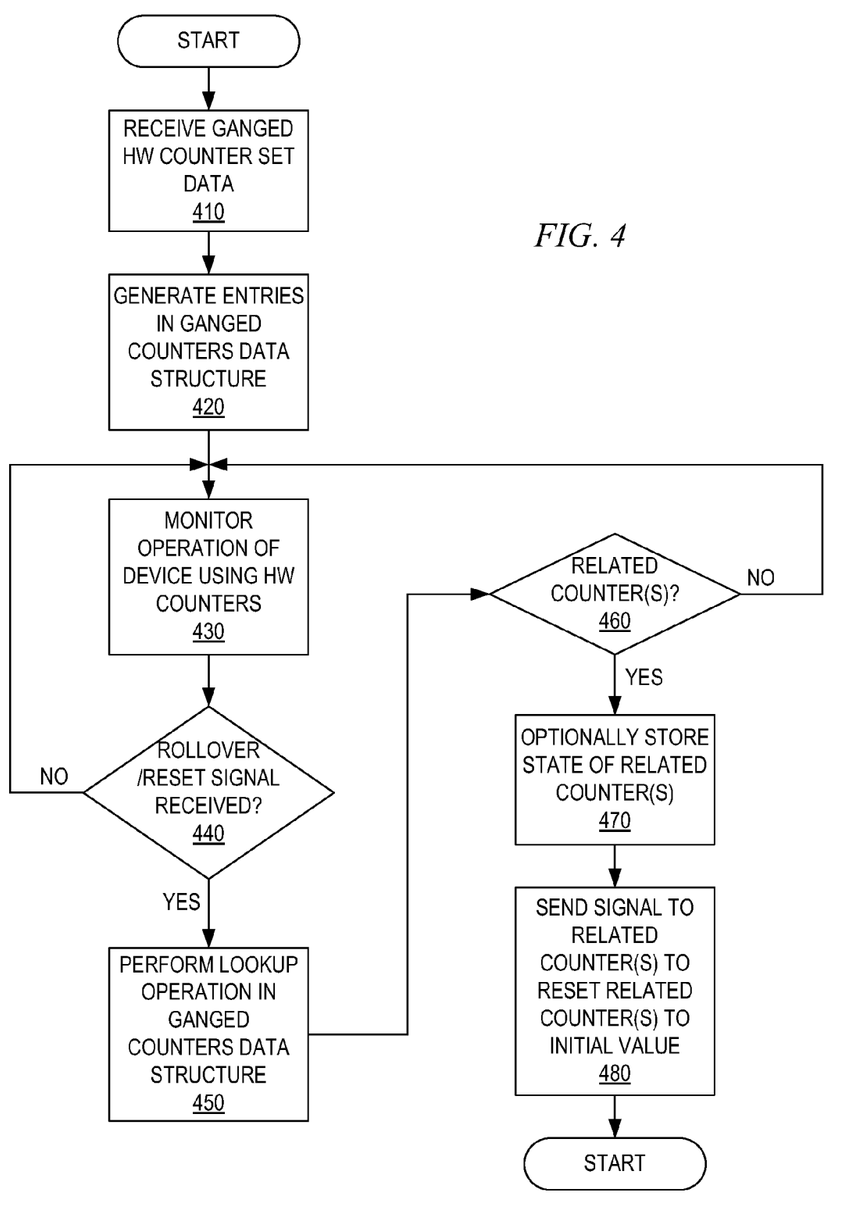
FIG. 4 is a flowchart outlining an example operation for performing a rollover or reset of a hardware counter in a set of ganged hardware counters in accordance with one illustrative embodiment.

FIG. 4 is a flowchart outlining an example operation for performing a rollover or reset of a hardware counter in a set of ganged hardware counters in accordance with one illustrative embodiment. The operation outlined in FIG. 4 may be implemented in ganged hardware counter rollover/reset logic 330 in FIG. 3, for example. Thus, the operations outlined in FIG. 4 may be implemented in hardware logic, firmware, or the like. While the illustrative embodiments describe the ganged hardware counter rollover/reset logic 330 as being either implemented in hardware or firmware, it should further be noted that in some embodiments the logic 330 may be implemented as software executed on one or more processors as well. Thus, the operation outlined in FIG. 4 may be implemented in hardware, software, or any combination of hardware and software.

As shown in FIG. 4, the operation starts with receiving ganged hardware counter set information identifying analytically related hardware performance counters (step 410). This information is used to generate entries in a ganged counters data structure that specify hardware performance counters that are analytically related to one another (step 420). The operation of the device, e.g., processor, integrated circuit chip, or the like, is monitored using the hardware performance counters (step 430). During such monitoring, a determination is made as to whether a signal is received from hardware performance counter monitoring a functional unit, bus, or other element of the device, indicating that the hardware performance counter has rolled-over or been reset (step 440). If not, the operation returns to step 430 and continue to monitor the operation of the device.

If a signal from a hardware performance counter is received, then a lookup operation is performed in the ganged counters data structure to identify any analytically related hardware performance counters (step 450). A determination is made as to whether there are any analytically related hardware performance counters in a ganged hardware counter set specified by entries in the ganged counters data structure (step 460). If not, the operation returns to step 430 and continues to monitor the operation of the device.

If there are analytically related hardware performance counters, the values of these related hardware performance counters may be optionally read and stored for later use by analysis tools (step 470). A signal is sent to each of the analytically related hardware performance counters to cause the analytically related hardware performance counters to reset to an initial value (step 480). The operation then terminates.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for controlling rollover or reset of hardware performance counters that count events occurring within the data processing system, comprising:

receiving, in ganged hardware performance counter rollover/reset logic of the data processing system, a signal indicating that a rollover or reset of a first hardware performance counter has occurred;

determining, by the ganged hardware performance counter rollover/reset logic, if the first hardware performance counter is analytically related to one or more second hardware performance counters;

sending, by the ganged hardware performance counter rollover/reset logic, a signal to each of the one or more second hardware performance counters in response to a determination that the first hardware performance counter is analytically related to the one or more second hardware performance counters; and resetting each of the one or more second hardware performance counters to an initial value in response to the one or more second hardware performance counters receiving the signal from the ganged hardware performance counter rollover/reset logic.

2. The method of claim 1, wherein determining if the first hardware performance counter is analytically related to one or more second hardware performance counters comprises retrieving a defined ganged hardware performance counter set corresponding to the first hardware performance counter, wherein the defined ganged hardware performance counter set comprises identifiers of the one or more second hardware performance counters identifying the one or more second hardware performance counters as being related to the first hardware performance counter.

3. The method of claim 2, wherein the defined ganged hardware performance counter set is either defined manually by a human user or automatically by an analytical tool based on a way in which the first hardware performance counter and the one or more second hardware performance counters are used by the analytical tool.

4. The method of claim 3, wherein the defined ganged hardware performance counter set is stored in a ganged counters data structure associated with the ganged hardware performance counter rollover/reset logic, and wherein determining if the first hardware performance counter is analytically related to one or more second hardware performance counters comprises performing a lookup operation in the ganged counters data structure based on an identity of the first hardware performance counter.

5. The method of claim 1, further comprising:
prior to resetting the one or more second hardware performance counters, storing a state of the one or more second hardware performance counters in counter state storage logic.

6. The method of claim 2, wherein the defined ganged hardware performance counter set is defined by a human user via a user interface of a performance analysis tool, and wherein the user interface provides a listing of the hardware performance counters that are available in the data processing system and user interface elements for specifying which ones of the hardware performance counters are analytically related to one another.

7. The method of claim 2, wherein the defined ganged hardware performance counter set is defined automatically by an analytical tool based on an analysis of analysis rules used by a performance analysis tool to determine which counter values together affect decisions made by the performance analysis tool using the analysis rules.

8. A computer program product comprising a non-transitory computer readable storage device having a computer readable program stored therein, wherein the computer readable program, when executed on a computing device, causes the computing device to control rollover or reset of hardware performance counters that count events occurring within the computing device by:
receiving a signal indicating that a rollover or reset of a first hardware performance counter has occurred;
determining if the first hardware performance counter is analytically related to one or more second hardware performance counters;
sending a signal to each of the one or more second hardware performance counters in response to a determination that the first hardware performance counter is analytically related to the one or more second hardware performance counters; and
resetting each of the one or more second hardware performance counters to an initial value in response to the one or more second hardware performance counters receiving the signal from the ganged hardware performance counter rollover/reset logic.

9. The computer program product of claim 8, wherein determining if the first hardware performance counter is analytically related to one or more second hardware performance counters comprises retrieving a defined ganged hardware performance counter set corresponding to the first hardware performance counter, wherein the defined ganged hardware performance counter set comprises identifiers of the one or more second hardware performance counters identifying the one or more second hardware performance counters as being related to the first hardware performance counter.

10. The computer program product of claim 9, wherein the defined ganged hardware performance counter set is either defined manually by a human user or automatically by an analytical tool based on a way in which the first hardware performance counter and the one or more second hardware performance counters are used by the analytical tool.

11. The computer program product of claim 10, wherein the defined ganged hardware performance counter set is stored in a ganged counters data structure associated with the ganged hardware performance counter rollover/reset logic, and wherein determining if the first hardware performance counter is analytically related to one or more second hardware performance counters comprises performing a lookup operation in the ganged counters data structure based on an identity of the first hardware performance counter.

12. The computer program product of claim 8, wherein the computer readable program further causes the computing device to:
store, prior to resetting the one or more second hardware performance counters, a state of the one or more second hardware performance counters in counter state storage logic.

13. The computer program product of claim 9, wherein the defined ganged hardware performance counter set is defined by a human user via a user interface of a performance analysis tool, and wherein the user interface provides a listing of the hardware performance counters that are available in the data processing system and user interface elements for specifying which ones of the hardware performance counters are analytically related to one another.

14. The computer program product of claim 9, wherein the defined ganged hardware performance counter set is defined automatically by an analytical tool based on an analysis of analysis rules used by a performance analysis tool to determine which counter values together affect decisions made by the performance analysis tool using the analysis rules.

15. An apparatus, comprising:
a plurality of hardware performance counters; and
ganged hardware performance counter rollover/reset logic coupled to the plurality of hardware performance counters, wherein the ganged hardware performance counter rollover/reset logic is configured to:
receive a signal indicating that a rollover or reset of a first hardware performance counter of the processor has occurred;
determine if the first hardware performance counter is analytically related to one or more second hardware performance counters;
send a signal to each of the one or more second hardware performance counters in response to a determination that the first hardware performance counter is analytically related to the one or more second hardware performance counters; and
reset each of the one or more second hardware performance counters to an initial value in response to the one or more second hardware performance counters receiving the signal from the ganged hardware performance counter rollover/reset logic.

16. The apparatus of claim 15, wherein the ganged hardware performance counter rollover/reset logic determines if the first hardware performance counter is analytically related to one or more second hardware performance counters by retrieving a defined ganged hardware performance counter set corresponding to the first hardware performance counter, wherein the defined ganged hardware performance counter set comprises identifiers of the one or more second hardware performance counters identifying the one or more second hardware performance counters as being related to the first hardware performance counter.

17. The apparatus of claim 16, wherein the defined ganged hardware performance counter set is either defined manually by a human user or automatically by an analytical tool based on a way in which the first hardware performance counter and the one or more second hardware performance counters are used by the analytical tool.

18. The apparatus of claim 17, wherein the defined ganged hardware performance counter set is stored in a ganged counters data structure associated with the ganged hardware performance counter rollover/reset logic, and wherein the ganged hardware performance counter rollover/reset logic determines if the first hardware performance counter is analytically related to one or more second hardware performance counters by performing a lookup operation in the ganged counters data structure based on an identity of the first hardware performance counter.

19. The apparatus of claim 15, wherein the ganged hardware performance counter rollover/reset logic is further configured to store, prior to resetting the one or more second hardware performance counters, a state of the one or more second hardware performance counters in counter state storage logic.

20. The apparatus of claim 16, wherein the defined ganged hardware performance counter set is either:

defined by a human user via a user interface of a performance analysis tool, and wherein the user interface provides a listing of the hardware performance counters that are available in the data processing system and user interface elements for specifying which ones of the hardware performance counters are analytically related to one another; or defined automatically by an analytical tool based on an analysis of analysis rules used by a performance analysis tool to determine which counter values together affect decisions made by the performance analysis tool using the analysis rules.

\* \* \* \* \*